United States Patent
Mottin

(10) Patent No.: US 8,220,698 B2
(45) Date of Patent: Jul. 17, 2012

(54) BRAZING METHOD AND CORRESPONDING DEVICE

(75) Inventor: Jean-Baptiste Mottin, Paris (FR)

(73) Assignee: Aircelle (FR)

( * ) Notice: Subject to any disclaimer, the term of this patent is extended or adjusted under 35 U.S.C. 154(b) by 62 days.

(21) Appl. No.: 12/517,782

(22) PCT Filed: Oct. 30, 2007

(86) PCT No.: PCT/FR2007/001793
§ 371 (c)(1),
(2), (4) Date: Feb. 8, 2010

(87) PCT Pub. No.: WO2008/068397
PCT Pub. Date: Jun. 12, 2008

(65) Prior Publication Data
US 2010/0140332 A1    Jun. 10, 2010

(30) Foreign Application Priority Data

Dec. 6, 2006 (FR) ..................................... 06 10622

(51) Int. Cl.
*B23K 5/22* (2006.01)
*B23K 31/02* (2006.01)
*B23K 35/12* (2006.01)

(52) U.S. Cl. ....................... 228/212; 228/233.1; 228/249

(58) Field of Classification Search .................. 228/212, 228/213, 44.3, 44.5, 44.7, 245, 249, 233.1
See application file for complete search history.

(56) References Cited

U.S. PATENT DOCUMENTS

| 2,794,243 | A | * | 6/1957 | Schweller | 228/183 |
| 3,755,881 | A | * | 9/1973 | White et al. | 228/160 |

(Continued)

FOREIGN PATENT DOCUMENTS

EP    0 549 385    6/1993

(Continued)

OTHER PUBLICATIONS

International Search Report; PCT/FR2007/001793; Apr. 4, 2008.

*Primary Examiner* — Kiley Stoner
*Assistant Examiner* — Carlos Gamino
(74) *Attorney, Agent, or Firm* — Cantor Colburn LLP

(57) ABSTRACT

The present invention relates to a method of brazing two materials (1, 2) together using a filler metal (3), which comprises the following steps: the filler metal is placed between the two contacting materials in a brazing zone where they are intended to be joined; on at least one of the two materials, which is mounted so as to move, a stress force is exerted along each of the directions of expansion provided for the two materials; the assembly in the brazing zone is brought to what is called a brazing temperature, which is both above the melting point of the filler metal and below the melting point of each of the two materials; during the temperature rise, the forces exerted on the materials to be assembled are gradually reduced as said materials expand, so that there is substantially no longer a force exerted on the materials when the brazing temperature is reached; and, once the filler metal has melted and wetted each material to be assembled, the assembly is cooled so as to solidify the filler metal, which therefore provides a bond between the two materials. The invention also relates to a device for implementing said method.

3 Claims, 1 Drawing Sheet

U.S. PATENT DOCUMENTS

| | | | | |
|---|---|---|---|---|
| 4,155,157 A | * | 5/1979 | Gersbacher | 29/726 |
| 4,286,744 A | * | 9/1981 | Gullotti et al. | 228/125 |
| 4,480,165 A | * | 10/1984 | Haushalter et al. | 219/85.1 |
| 4,878,611 A | * | 11/1989 | LoVasco et al. | 228/180.22 |
| 5,470,014 A | * | 11/1995 | Pritchard et al. | 228/208 |
| 5,848,746 A | * | 12/1998 | Wagner et al. | 228/44.3 |
| 5,964,396 A | * | 10/1999 | Brofman et al. | 228/180.22 |
| 6,129,257 A | * | 10/2000 | Xu et al. | 228/44.3 |
| 6,708,862 B2 | * | 3/2004 | Fujii et al. | 228/6.2 |

FOREIGN PATENT DOCUMENTS

| | | |
|---|---|---|
| EP | 1 552 900 | 7/2005 |
| GB | 1 469 685 | 4/1977 |
| GB | 2 308 680 | 7/1997 |

\* cited by examiner

BRAZING METHOD AND CORRESPONDING DEVICE

TECHNICAL FIELD OF THE INVENTION

The present invention relates to a brazing method, more particularly one intended for the aeronautical field, and to a device for implementing it.

BRIEF DESCRIPTION OF RELATED ART

Brazing is a technique for joining two materials using a filler metal of different nature, having a melting point below that of the materials to be joined and capable of suitably wetting the surfaces of said materials, these surfaces not participating by their melting to the formation of the brazed joint.

In practice, brazing is carried out by interposing the filler metal between the two components to be joined, the brazing zone then being heated to a temperature that allows the filler metal to melt but not the components to be joined. The liquefied filler metal wets the surfaces of the two components to be joined and is then cooled so as to solidify between the two components in order to bond them together.

The brazing zone may conventionally be heated by the flame of a torch, by an electric arc or by a laser. Furnace brazing techniques are also known in which the brazing is carried out in various types of atmosphere.

Generally, the filler metal is tin, copper, silver, aluminum, nickel or alloys of precious metals.

In certain technical fields, such as for example the aeronautical field, the geometry of the various components assumes a particular importance and poor positioning of the workpieces to be joined may have an impact on the overall performance of the device in question. Thus, it is necessary to be able to optimally control the positioning of the workpieces with respect to each other and the thickness of the brazed joint.

To achieve this, one usual technique consists in prejoining the workpieces in question to a strip of the filler metal, by producing several spot welds. These spot welds are generally produced by electrical resistance welding.

However, one drawback of this prejoining is the presence of marks on the workpieces to be joined in the brazing region. These marks reduce the total area brazed. In addition, the quality of the bonding produced is not regular and the spot welds also include filler metal.

Within the context of high-tech applications, such as the joining of an external skin intended to form an airplane nacelle nozzle with a stiffener, it will be readily understood that these marks also constitute undesirable surface irregularities that will reduce the aerodynamic performance of the assembly.

Moreover, such prejoining ignores the deformation of the workpieces to be joined due to the effect of the heat, thereby possibly resulting in joining defects. The brazing is then carried out with the materials under stress, which may result in the aerodynamic line being deformed.

BRIEF SUMMARY OF THE INVENTION

The invention alleviates the aforementioned drawbacks and provides a method of brazing two materials together using a filler metal, which comprises the following steps:
the filler metal is placed between the two contacting materials in a brazing zone where they are intended to be joined;
a stressing force is exerted on at least one of the two materials, which is mounted so as to move, said force being along each of the intended expansion directions of the two materials;
the assembly is brought in the brazing zone to a temperature referred to as the brazing temperature, which is both above the melting point of the filler metal and below the melting point of each of the two materials;
during the temperature rise, the forces exerted on the materials to be joined together are gradually reduced as said materials expand, so that there is substantially no longer any force exerted on the materials when the brazing temperature is reached; and
once the filler metal has melted and wetted each of the materials to be joined together, the assembly is cooled so as to solidify the filler metal, which therefore provides a bond between the two materials.

Thus, by exerting forces on the materials to be joined before the temperature rise, these forces enable the materials capable of moving relative to one another to be always held in mutual contact despite their respective expansions and to follow the deformations due to this expansion. In this way, the materials to be joined may expand freely and there are no longer expansion stresses in the materials to be joined during the brazing. Moreover, the formation of spot welds necessary for the prejoining phase is thus avoided, the variable forces exerted on the materials enabling them to be held in mutual contact.

Preferably, the materials to be brazed are made of the same substance. Thus, the deformations due to the expansion of the materials are similar between the two parts to be brazed.

The present invention also relates to a device for implementing a brazing method according to the invention, which comprises a first support intended to receive and hold in place a first material and a second support intended to receive and hold in place a second material to be joined to the first material by brazing, characterized in that the second support is capable of moving under the action of elastic stressing means, the forces exerted by said elastic stressing means being calculated so that, at the brazing temperature, they substantially no longer exert forces on the materials to be joined.

Preferably, the elastic stressing means comprise expansion tubes.

Alternatively or additionally, the elastic stressing means comprise springs.

Again alternatively, or additionally, the elastic stressing means comprise spring blades.

Advantageously, the second support is mounted so as to move translationally on a plate having a slideway link. Preferably, the support plate is equipped with an elastic stressing means capable of deforming along one direction of the slideway.

Again advantageously, the stressing means is mounted so as to bear on a stop means that can be adjusted along the slideway.

According to a preferred embodiment of the invention, the support plate is mounted on an elastic arm constituting a second stressing means, for stressing in a direction approximately normal to said support plate.

Advantageously, the arm can be adjusted along a direction normal to the support plate.

Preferably, the device is made of a material having a lower expansion coefficient than the expansion coefficient of the materials to be brazed.

BRIEF DESCRIPTION OF THE DRAWINGS

The implementation of the invention will be better understood with the aid of the detailed description given below with regard to the appended drawings in which.

DETAILED DESCRIPTION OF THE INVENTION

The following examples will be described in relation to an operator desiring to join together, by brazing, an external skin 1 made of thin sheet metal constituting a turbojet nacelle nozzle and a stiffener 2 also made of thin sheet metal. The present invention is of course not limited to this field of application nor to this type of material.

Figure 1:
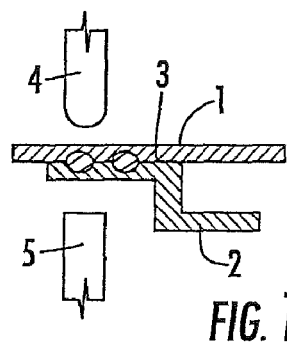
FIG. 1 is a schematic sectional representation of a brazed joint according to the prior art.

As shown in FIG. 1, one method of producing a brazed joint according to the prior art includes a prebrazing step for the purpose of prejoining the external skin 1, its stiffener 2 and a sheet 3 of a brazed metal sandwiched between the external skin 1 and its stiffener 2. This prebrazing step comprises the formation of a plurality of discrete spot welds distributed over the brazing zone and produced using a set of electrodes 4, 5.

As explained above, the formation of these spot welds leaves marks that affect the aerodynamic performance of the external skin 1 and the spot welds include both metal coming from the external skin 1 and metal coming from the stiffener 2 together with metal of the sheet 3 of brazing metal. This results in inhomogeneous spot welds that may be embrittled.

The present invention enables these drawbacks to be alleviated and consists in eliminating the prebrazing step by bringing the external skin 1 and the stiffener into contact with each other in the brazing zone under external stresses enabling the expansion forces to be followed while still keeping the materials in mutual contact.

Figure 2:
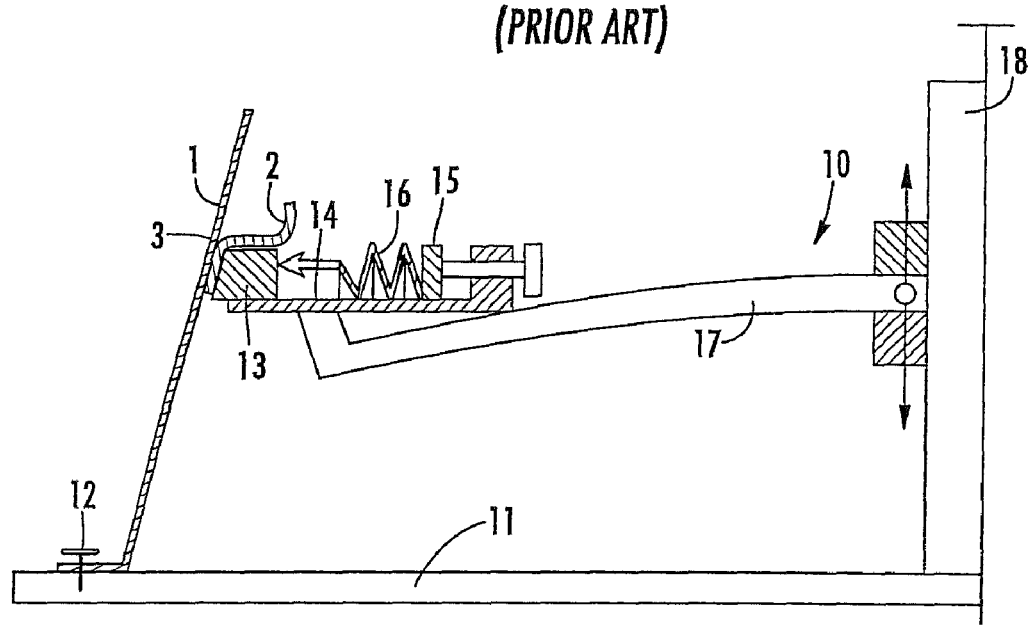
FIG. 2 is a schematic sectional representation of a brazing device according to the invention.
Figure 3:
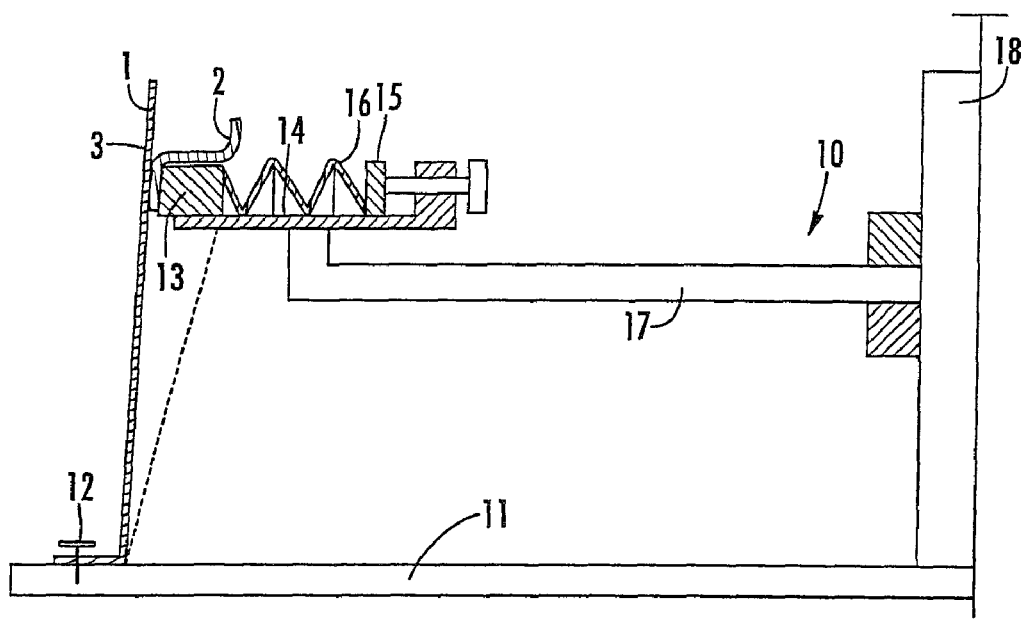
FIG. 3 is a schematic sectional representation of the device of FIG. 2 during the brazing stage.

This method can be implemented using a device 10 according to the invention, as shown in FIGS. 2 and 3.

The device 10 comprises, on the one hand, a base plate 11, to which the external skin 1 to be brazed is fastened by means of a fastening clamp 12, and, on the other hand, a bearing sector 13 preferably made of carbon, to which the stiffener 2 is fastened.

This bearing sector 13 is mounted so as to slide on a support plate 14 via a slideway link, the support plate having, on the side opposite the bearing sector 13, an adjustable stop 15 placed along the axis of the slideway link and serving as support for the elastic stressing means 16, which takes the form of a spring or of expansion tubes.

The support plate 14 is supported by at least one arm 17, also made of an elastic material, for example a spring blade, and is fastened in a wall 18 perpendicular to the base plate 11. More precisely, the arm 17 is adjustably fastened along the wall 18.

Before the external skin 1 and the stiffener 2 are installed, the elastic stressing means are calibrated so as to be at rest and no longer to exert force on the bearing sector 13 when the latter is in the position in which the two materials are in mutual contact at the brazing temperature after having expanded. Expansion calculations or experiments enable these positions to be determined. The elastic stressing means 16 and the arm 17 are set at rest in this position using respectively the adjustable stop 15 and the adjustable support for adjusting the arm 17 along the wall 18.

When fastening the components to be brazed, namely the external skin 1 and the stiffener 2, to the device, these components are at ambient temperature and are therefore not expanded.

Consequently, the bearing sector 13 is forced back relative to its position that has served for calibrating the elastic stressing means 16 and the elastic arm 17.

In this way, the elastic stressing means 16 is slightly compressed and exerts a force on the bearing sector along the direction of the slideway.

The same applies to the arm 17, which therefore exerts a force along a direction normal to the support plate 14 and to the slideway.

FIG. 2 shows the described device in its entirety at ambient temperature before the start of the brazing cycle.

Upon being heated, the external skin 1 and the stiffener 2 experience expansion forces and their relative positions change. More precisely, the external skin 1 has a tendency to move away from the stiffener 2. The initial positions of the external skin 1 and the stiffener 2 are shown by the dotted lines in FIG. 3.

The device 10 according to the present invention allows these expansion forces to be followed and to adapt thereto while the assembly to be brazed is in the brazing furnace and is inaccessible.

Since the stiffener 2 is mounted on a movable bearing sector on which forces are exerted that tend to keep it toward the external skin 1, the movement of this skin away from the stiffener enables the bearing sector 13 to move along the slideway and the support plate 14 to rise under the effect of the elastic stressing means 16 and the elastic arm 17 respectively, the stiffener therefore being constantly kept in contact with the external skin 1 as a function of the expansions.

Since the elastic stressing means 16 and the arm 17 are calibrated so as to no longer exert stressing force on the bearing sector 13 when the external skin 1 and the stiffener 2 are at the brazing temperature, there are no longer expansion forces or stressing forces exerted between the components to be brazed during the brazing stage.

Although the invention has been described in conjunction with particular exemplary embodiments, it is obvious that it is in no way limited thereto and that it includes all the technical equivalents of the means described and combinations thereof, provided that said combinations fall within the scope of the invention.

The invention claimed is:

1. A method of brazing two materials together using a filler metal, comprising:

placing the filler metal between a first contacting material and a second contacting material in a brazing zone in which said first contacting material and said second contacting material are to be joined, said first contacting material and said second contacting material being mounted so as to be movable on a support;

positioning the filler metal between said first contacting material and said second contacting material, such that a substantial entirety of a first surface of the filler material contacts said first contacting material and a substantial entirety of a second surface of the filler material contacts said second contacting material, said first surface of the filler material being opposite said second surface of the filler material;

applying a stressing force to said second contacting material via a stressing means, said stressing means moving said second contacting material in at least one direction of expansion of said first contacting material due to eventual heating of said first contacting material, wherein said first contacting material, the filler material, and said second contacting material each move in said at least one direction of expansion;

maintaining contact between said substantial entirety of said first surface of the filler material and said first contacting material and contact between said substantial entirety of said second surface of the filler material and said second contacting material at the brazing zone via said stressing force, said applying and maintaining occurring prior to exposure of said first contacting material and said second contacting material to a brazing temperature;

exposing said first contacting material and said second contacting material to said brazing temperature in said brazing zone, said brazing temperature being both above a melting point of the filler metal and below a melting point of each of said first contacting material and said second contacting material;

gradually reducing said stressing force exerted on said first contacting material and said second contacting material as said first contacting material and said second contacting material expand during said exposing, exertion of said stressing force having substantially ceased on said first contacting material and said second contacting material when said brazing temperature is achieved; and cooling said first contacting material and said second contacting material once the filler metal has melted and wetted each of said first contacting material and said second contacting material, said cooling solidifying the filler metal, providing a bond between said first contacting material and said second contacting material, wherein said movement in at least one direction of expansion is vectorial and includes a substantially horizontal component and a substantially vertical component.

2. The method as claimed in claim 1, wherein the materials to be brazed are made of the same substance.

3. The method of claim 1, wherein said stressing means is a first actuator and a second actuator, said first actuator is responsible for movement along said substantially horizontal component and said second actuator is responsible for movement along said substantially vertical component.

* * * * *